United States Patent

[11] 3,595,178

[72] Inventor Karl Edvard Olof Dahlen
 Boras, Sweden
[21] Appl. No. 761,737
[22] Filed Sept. 23, 1968
[45] Patented July 27, 1971
[73] Assignee Elektro-Dahlen A B
 Boras, Sweden
[32] Priority Oct. 6, 1967
[33] Sweden
[31] 13,685/67

[54] BAKERY OVEN
 8 Claims, 6 Drawing Figs.
[52] U.S. Cl. .................................................. 107/55, 107/60
[51] Int. Cl. .................................................. A21b 1/00
[50] Field of Search .................................................. 107/55, 56, 57, 60, 62, 64; 126/19, 20; 25/142 D, 142 F, 142 N; 34/184—188, 194, 216, 217; 211/71

[56] References Cited
UNITED STATES PATENTS
3,402,683 9/1968 Tillander et al. ............... 107/55
3,412,695 11/1968 Anderson ..................... 107/55
FOREIGN PATENTS
21,205 1/1930 Netherlands ................. 34/204
1,033,894 4/1953 France ......................... 34/187

Primary Examiner—Walter A. Scheel
Assistant Examiner—Arthur O. Henderson
Attorney—Holman & Stern ABSTRACT: For facilitating the cleaning of bakery ovens and preventing damage due to corrosion, mechanism is provided for rotating the tray cart or truck within the oven, with such mechanism being located in the top of the oven and so designed that the mechanism, when the cart is pushed into the oven, will lift the cart free of the oven floor.

3,595,178

BAKERY OVEN

BACKGROUND OF THE INVENTION

The present invention relates to bakery ovens of the type provided with a device for rotating at least one wheeled transport truck or cart (multilayer carriage) about a vertical axis.

The advantage of such an arrangement is that the articles placed on the trays of the cart will be uniformly baked. With this known type of oven, the baking is effected by means of heated air, which is caused to flow about the pieces of dough. The hot air, however, removes the steam expelled from the dough which makes the products dry thus lacking the desired succulence. It has been proposed to eliminate this disadvantage by injecting steam into the oven in order to increase the moisture therein. One disadvantage of this arrangement is that an appreciable amount of condensed water will be collected on the floor of the oven, and as the device adapted to rotate the carts is sunk into the floor, it is open to corrosion attack. The member carrying the cart usually consists of a comparatively large and heavy platform which, together with the driving transmission, is located in a recess in the floor of the oven into which the condensed water will flow. This recess must be cleaned every day, which means that the heavy platform must be removed. A further disadvantage with this known design is that the level of the floor within the oven will be considerably higher than that of the surrounding floor thereby requiring a short ramp between the surrounding floor and the floor within the oven. When the cart is pushed into the oven it must transverse this ramp, during which the trays on the cart will be inclined and the dough pieces thereon will easily be displaced.

SUMMARY OF THE INVENTION

The object of the present invention is to eliminate the disadvantages mentioned above, and to provide an oven having a smooth floor which is easy to clean and which is located essentially level with the surrounding floor. A further object of the invention is to provide a supporting means for carrying and rotating the cart which, due to its location only to a small extent, will be subjected to corrosive attack. The invention is essentially characterized in the device is located in the upper part of the oven and provided with members for connection with means at the upper part of the cart, with the member and means been designed, when interconnected, to lift the cart free of the floor of the oven.

BRIEF DESCRIPTION OF THE DRAWINGS

The invention will below be described with reference to the accompanying drawings on which

DESCRIPTION OF THE PREFERRED EMBODIMENT

Figure 1:
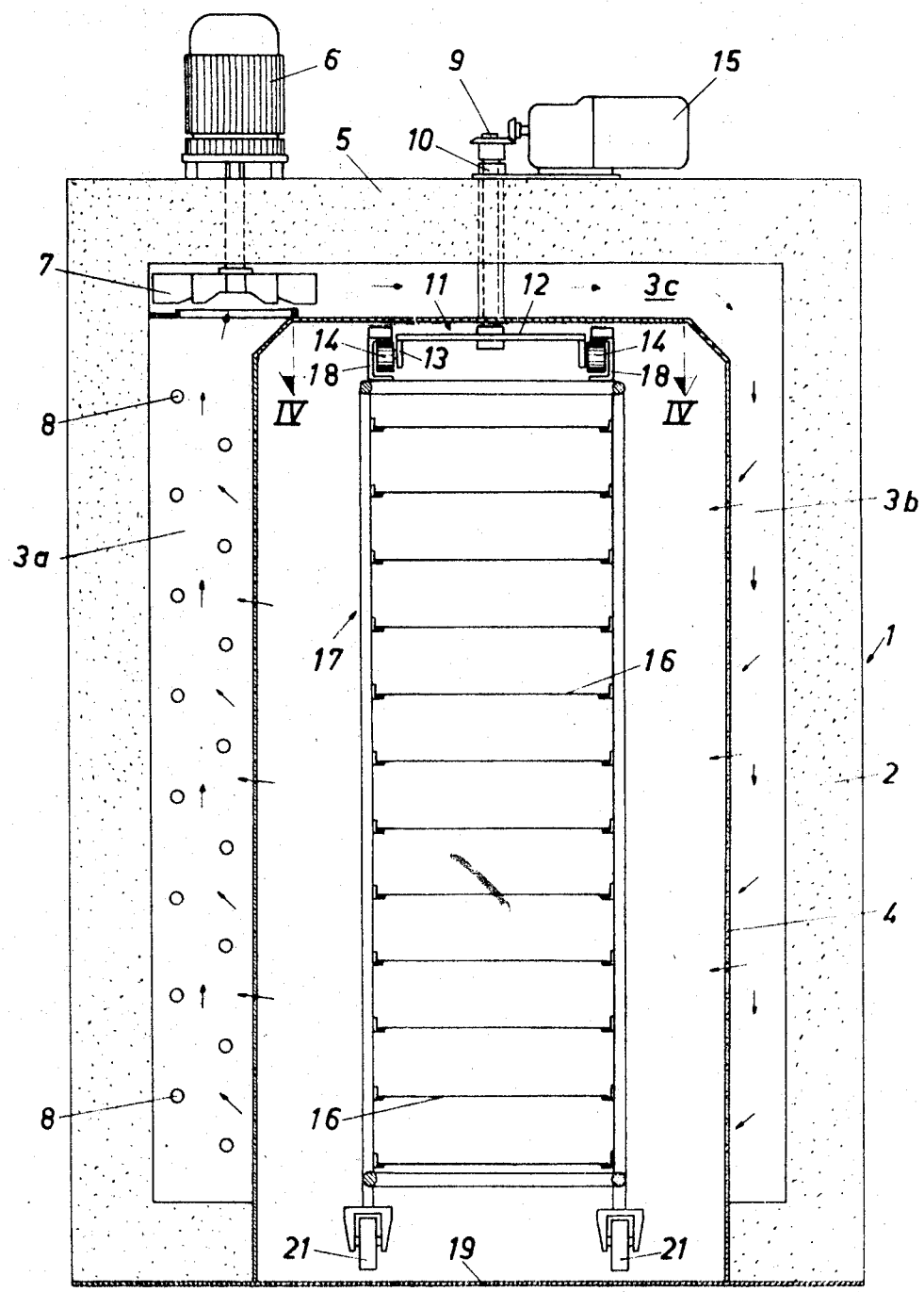
FIG. 1 shows a cross section through an oven according to the invention.
Figure 2:
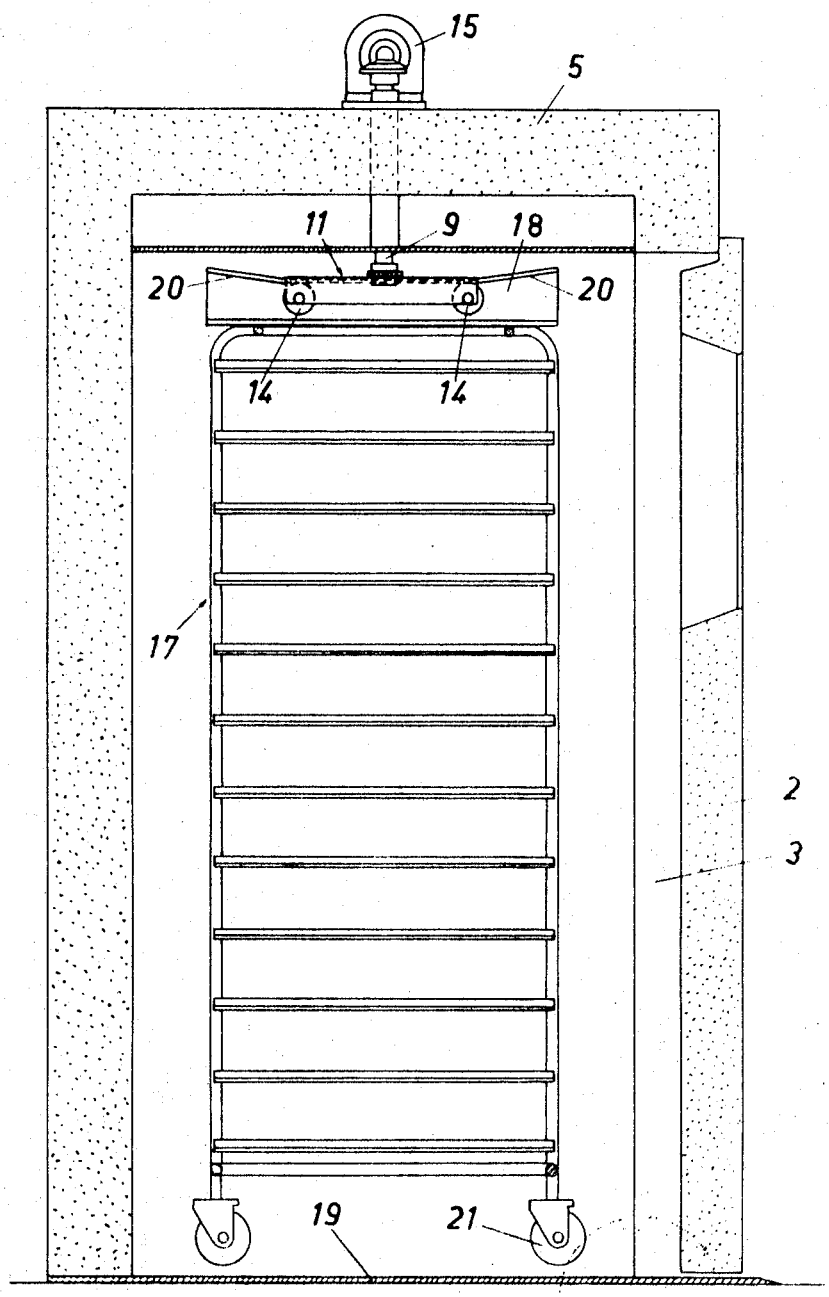
FIG. 2 shows a longitudinal section through the oven.
Figure 3:
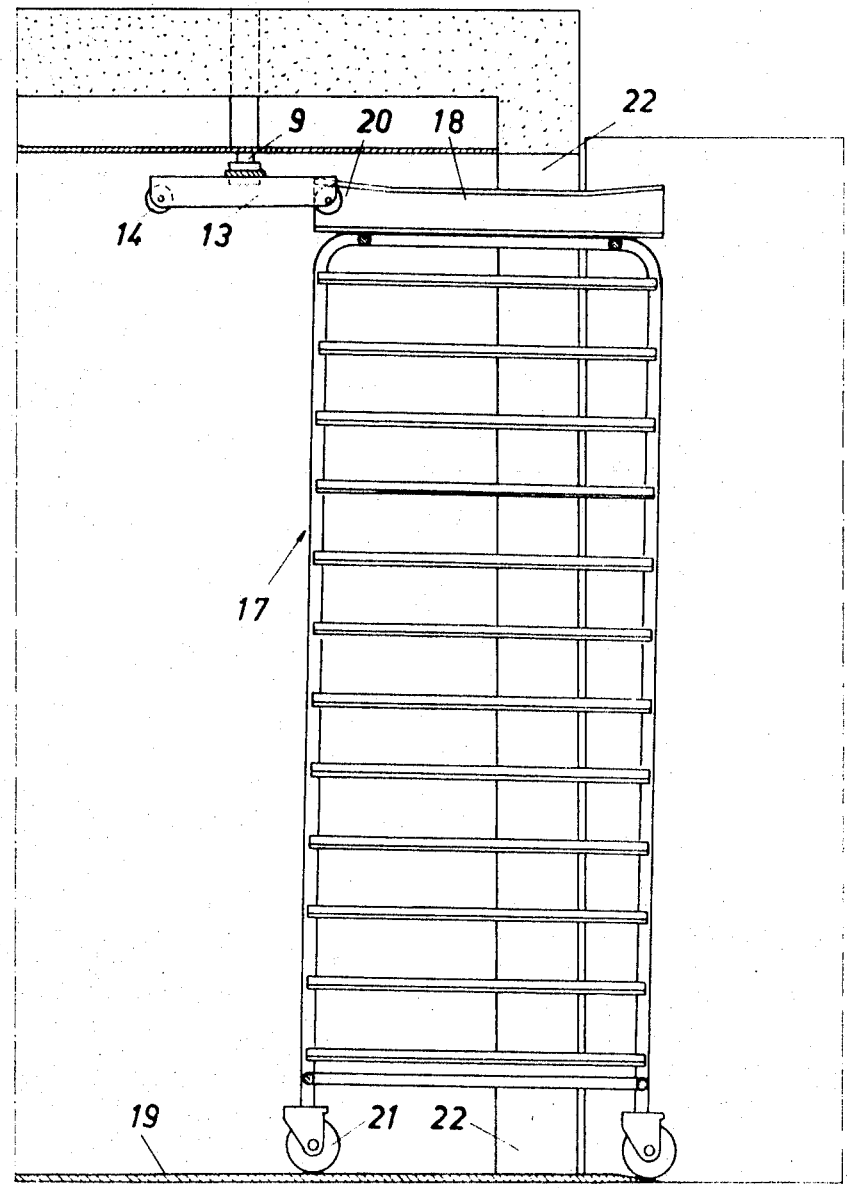
FIG. 3 shows a section through part of the oven in which a cart is about to contact the device.
Figure 4:
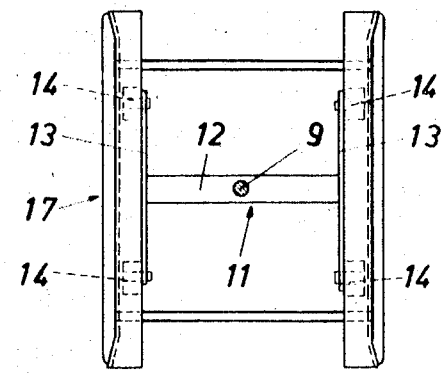
FIG. 4 shows a section along line IV–IV of FIG. 1.
Figure 5:
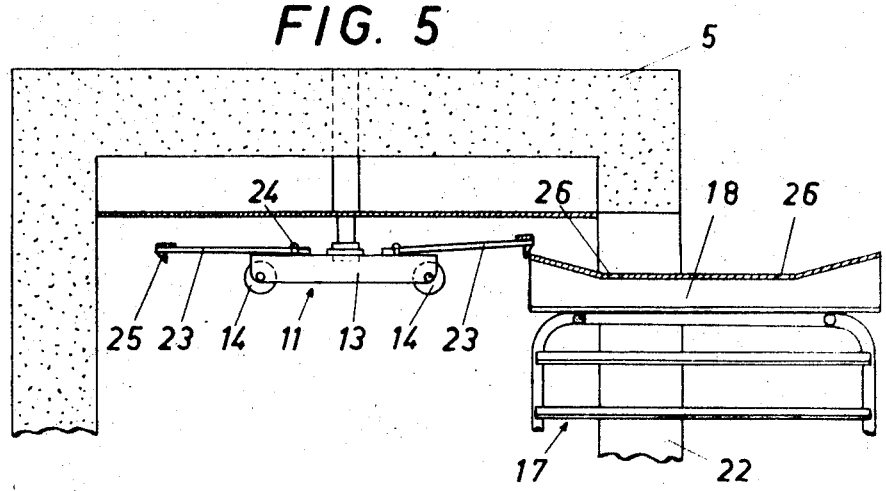
FIG. 5 shows a section through the upper part of modified design of the oven.

The oven is generally denoted 1 and comprises an insulated outer wall 2 along the inside of which a passage is formed by means of a perforated plate 4. In the roof or top 5 of the oven 1, a fan 7 driven by a motor 6 is arranged and located close to one of the sidewalls of the oven. The fan draws air from passage 3a along one of the vertical sides of the oven, and a number of heating elements 8 are located in the passage for forcing and the air to the passage 3b at the opposite vertical sidewall of the oven. From this, the air can flow into the oven through the perforations in the plate 4.

In the middle part of the top 5, is located a vertical rotatable shaft 9 carried by a combined radial-axial bearing 10 at the outside of the top. The shaft 9 passes through the top 5 as well as the air passage 3c. At the lower end of the shaft 9, which extends into the over, per se is a device 11 fitted. The device 11 includes a yoke 12, which at its ends is connected to a bar 13 in such a manner that the device 11 is in the form of an H.

A guiding roller 14 is fitted to each end of the bar 13 so that all rollers are located in the same horizontal plane. The shaft 9 is driven by any suitable means such as for instance a motor 15 and bevel gearing.

The formed pieces of dough (not shown) are located on trays 16 which are placed on a cart 17 in superimposed layers. The cart is, at its upper part, provided with two spaced horizontal rails 18, each of which has an upper horizontal flange. The outer ends of the upper flanges are flared away from the cart in such a manner that they form funnellike inlets. The height of the cart 17 above floor 19 of the oven is so chosen that the upper flange of flared portion 20 of the rails 18 is located level with the upper edges of the guiding rollers 14. The distance from the main part of the rails 18, located between the flared portions 20, and the lowermost portion of the cart, i.e. wheels 21, is somewhat less than the distance between the upper edges of the guiding rollers 14 and the floor 19 of the oven. This difference corresponds to the desired lifting of the cart.

The floor 19 preferably consists of a plate or the like, which extends outside a door opening 22 of the oven sufficiently to permit the first pair of rollers 14 to contact the flared portions 20 of the guiding rails 18 when the pair of hind wheels reach the extended portion of the plate. By this arrangement, a smooth connection of the cart to the device is obtained.

In order to limit the movement of the guiding rails 18 in relation to the yoke 12, the latter or the bars 13, may be provided with locking members 23, each of which by means of a hinge 24 is connected to the yoke. Each locking member is at its front end, provided with a hook 25 terminating in a point. The driving means 15 for the device 11 is designed in such a manner that the empty yoke 12 will always be maintained in a position to permit the bars 13 to be directed towards the door 22 of the oven. When the cart is wheeled into the oven, the locking member 23 directed towards the opening will be swung upwards by the flared end of the guiding rail and is in this manner brought out of action. When the cart has been moved sufficiently to be carried by the rollers 14, and the vertical axis of the cart coincides with the rotatable shaft 9, the flared end of the guiding rail 18 will contact the point of the other locking member 23 so that further displacement of the cart is prevented. In this position, the hook 25 of the foremost locking member 23 will leave the guiding rail 18, and lock this at the opposite end in such a manner that the cart is completely fixed. By lifting one of the locking members 23, the cart may be withdrawn.

Instead of the locking members 23, the part of the guiding rails 18 adapted to carry the rollers 14 in working position may be provided with recessed portions 26 spaced a distance corresponding to the distance between the rollers 14, so that these, when the cart reaches the desired position, will sink into the recesses.

Figure 6:
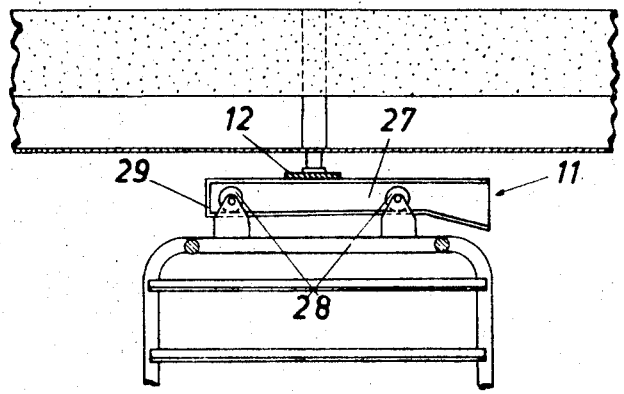
FIG. 6 shows a view similar to FIG. 5 of a further modified embodiment.

FIG. 6 shows a modified embodiment of the device 11, which is the opposite of the arrangement according to FIGS. 1—5, in that the yoke 12 at each end carries a guiding rail 27. The upper part of the cart is provided with guiding rollers 28, which mate with the rails 27. The rollers are adapted to cooperate with the lower edges of the rails. One end of the rail is flared downwardly whereby the lower flange of said end is located level with the lower edge of the roller 28 when the cart rests on the floor on the oven. The end of the rail 27 remote from the flared end is provided with a locking member 29 for preventing the rollers 28 from passing through the rails. The rails furthermore may be slightly inclined away from the inlet to permit the rollers 28 to slide towards the locking member 29.

I claim:

1. In a bakery oven having sidewalls, a floor, a top and an opening in one of its sidewalls extending essentially over the total height of the oven for permitting a multilayer, wheeled cart to be pushed into and removed from the oven, a device mounted for rotary movement in the top of the oven including a member for engaging means at the upper part of the cart, said member and said means being provided with complementary components operable, when the cart is pushed into the oven, to interconnect to lift the cart free of the floor of the oven and upon rotary movement being imparted to the device to transfer a rotating movement from the device to the cart.

2. The bakery oven according to claim 1 in which the device includes a yoke carried by the lower end of a vertical rotatable shaft passing through the top of the oven, said yoke, at its ends, being provided with rollers designed for cooperation with said means at the upper part of the cart and said means at the upper part of the cart including two spaced parallel horizontal rails, each having an upper horizontal flange, at least one outer edge of each of said rails being flared away from the cart to define funnellike inlets for the rollers which, when supported on the horizontal flanges of the rails, are located sufficiently high above the floor to effect the desired lifting of the cart, and means to rotate the shaft when the cart is lifted.

3. The bakery oven according to claim 2, in which a horizontal bar is provided at each end of the yoke, and a roller mounted at each end of each bar.

4. The bakery oven according to claim 2 in which said shaft is located substantially centrally in the oven and said device is provided with locking means to retain the cart in relation to the device in a position in which the rotatable shaft coincides with the vertical axis of the cart and each locking means consists of a recessed part at an appropriate portion of each of the rails adapted to fit a roller to permit the same partly to sink therein when the cart has reached the position desired for rotation.

5. The bakery oven according to claim 2 in which the outer edge of both rails is provided with a funnellike inlet and each end of the yoke includes resilient means cooperable with the inlets to fix the cart on the rails when the cart has reached the position desired for rotation.

6. The bakery oven according to claim 1 in which the means at the upper part of the cart includes rollers, and the device includes a yoke carried by the lower end of a vertical rotatable shaft passing through the top of the oven, said yoke, at each of its ends, being provided with a guiding rail, each having a lower horizontal flange, at least one end of each rail being flared away from the top to define a funnellike inlet for said rollers, said rails being located sufficiently high above the floor of the oven to effect the desired lifting of the cart when the rollers are supported on the flanges, and means to rotate the shaft when the cart is lifted.

7. The bakery oven according to claim 6 in which each guiding rail is provided with a funnellike inlet at one end only, and the other end being closed to prevent the rollers from passing 8. The bakery oven according to claim 1 in which the device is provided with a vertical rotatable shaft located substantially centrally in the oven and with locking means to retain the cart in relation to the device in a position in which the rotatable shaft coincides with the vertical axis of the cart.